United States Patent [19]

Mohel

[11] Patent Number: 5,177,430

[45] Date of Patent: Jan. 5, 1993

[54] CIRCUIT FOR SECURING A POWER SUPPLY

[76] Inventor: Moshe Mohel, Havazelet Nasharon St., Kfar Saba, Israel

[21] Appl. No.: 511,184

[22] Filed: Apr. 19, 1990

[51] Int. Cl.$^5$ ............................................. G05F 1/565
[52] U.S. Cl. ..................................... 323/284; 323/234; 323/312
[58] Field of Search ............... 323/222, 234, 282, 284, 323/293, 312; 320/22, 23, 24

[56] References Cited

U.S. PATENT DOCUMENTS

| | | | |
|---|---|---|---|
| 3,428,882 | 2/1969 | Gilbert | 321/18 |
| 3,585,482 | 6/1971 | Zelina | 320/39 |
| 3,697,856 | 10/1972 | Huang | 321/10 |
| 3,889,176 | 6/1975 | Randall | 323/8 |
| 4,168,477 | 9/1979 | Burchall | 323/222 |
| 4,186,336 | 1/1980 | Weinberg et al. | 323/15 |
| 4,238,690 | 12/1980 | Clarke | 307/44 |
| 4,242,629 | 12/1980 | Shuey | 323/17 |
| 4,355,277 | 10/1982 | Davis et al. | 323/222 |
| 4,584,517 | 4/1986 | Schwob | 323/222 |
| 4,714,868 | 12/1987 | Maruyama | 320/40 |
| 4,755,733 | 7/1988 | Laliberte | 320/23 |
| 4,779,035 | 10/1988 | Engelmann | 320/39 |
| 4,820,965 | 4/1989 | Siemer | 320/31 |
| 4,839,574 | 6/1989 | Takabayashi | 320/24 |
| 4,843,299 | 6/1989 | Hutchings | 320/31 |

Primary Examiner—Steven L. Stephan
Assistant Examiner—Nilay Vyas
Attorney, Agent, or Firm—Patrick J. Coyne

[57] ABSTRACT

A circuit for securing a power supply is provided. The circuit consists of an energy storage means for supplying current to a load. The energy storage means receives current from the power supply at first and second current levels. The first current level is greater than the average current necessary to supply the load and the second current level is less than the average current necessary to supply the load. The current level of the power supply alternates between the first and second current levels as a function of a comparator means and a switching means assuring an adequate supply of current to the load. The comparator means compares the voltage across the energy storage means to a reference voltage and actuates the switching means. Hence, the current supplied by the power supply is different than the current supplied by the energy storage means to the load and the electrical characteristics of the load remain undetectable from the radio frequency emissions of the power supply.

17 Claims, 2 Drawing Sheets

CIRCUIT FOR SECURING A POWER SUPPLY

The present invention relates to a circuit for securing a power supply so that the characteristics of a load coupled to the power supply cannot be determined by monitoring the current driven by the power supply or by monitoring the radiation that is generated by the power supply.

BACKGROUND OF INVENTION

Power supplies typically draw current from a source of power, (such as a generator or electric utility grid, etc.). A power supply typically generates radiation that correlates with the amount of energy required by the load connected to the output of the power supply. By monitoring the current driven by the power supply, or the energy radiated from the power supply, it may be possible to ascertain the nature of the load. In some applications, however, it is desirable that the characteristics of the load be kept secret. For example, the load could be a telephone, teleprinter, or computer handling secret or classified information. Absent some precaution to secure the power supply, it may be possible for one to monitor the current provided by the power supply or the radiation emarating from the power supply and ascertain the nature of the secured load. A device for operating a power supply so that the electrical characteristics of a load cannot be determined by monitoring the energy radiated from the power supply is desirable in these circumstances.

Prior attempts have been made to develop circuits to secure a power supply. These circuits typically involve operating a complimentary load in parallel with the load that has to be kept secure. This type of circuit is illustrated in FIG. 2. The complimentary load is in parallel with the load desired to be kept secure. In this conventional arrangement, the power supply output is held at a substantially constant arbitrary level, which is at least as high as the maximum voltage required to power the true load being secured. The complimentary load is controlled in a way that ensures that the sum of the current across both loads is constant. Therefore, a constant current is driven from the power supply. Hence, if the energy radiated from the power supply is monitored, constant output will be detected, preventing the characteristics of the load from being ascertained.

The conventional circuit operates, not by isolating the power supply from the load, but rather by having the power supply operate at a substantially constant load above what is necessary for operation of the true load. Since the power supply is operating at full load capacity all the time, a large part of the energy of the power supply is wasted on a complimentary load. A second disadvantage is that this type of circuit is that it is hard to operate at high frequencies. A third major disadvantage of this type of circuit is that, in case there is more than one secure load connected to the power supply, each load requires its own complimentary load. This circuitry is not only costly but inefficient as well. Moreover, this type of circuit is relatively complex and results in a slight delay in the time the current necessary to power the true load reaches the load.

Thus, a need exists for a simple, efficient, economical, effective, and reliable secure power supply. The present invention overcomes the disadvantages of the prior art by using a "constant current" or "constant power" power supply that provides energy to an energy storage device. The load current is driven from this energy storage device but does not have any direct influence on the "constant current" or "constant power" provided to the power supply. In this system, the momentary value of the load current does not influence the current supplied by the power supply. Thus, the electrical characteristics of the load are isolated from the radiated energy spectrum of the power supply. The characteristics of the load cannot be detected by monitoring the current of the power supply.

SUMMARY OF THE INVENTION

The present invention isolates the electrical characteristics of a load from the electrical current driven by the power supply as well as from the energy radiated from the power supply. In a preferred embodiment, the circuit of the present invention comprises an energy storage means for receiving electrical energy from the power supply and supplying current to the load, switching means for controlling the current supplied by the power supply to the energy storage means so that the power supply delivers electrical energy to said energy storage means at first and second current levels, said first current level being greater than the average current required to supply the load and said second current level being less than the average current required to supply the load, and comparator means for comparing the level of charge of the energy storage means to a reference level and actuating said switching means so that the current supplied by the power supply to said energy storage means is different than the current supplied by said energy storage means to the load. The average output of the power supply over time equals the energy requirements of the load, while preventing the electrical characteristics of the load from being determined from the radio frequency emissions of the power supply or from current supplied to the power supply from an external source.

An advantage of the circuit of the present invention is to provide a secure power supply wherein the characteristics of a load coupled to the power supply cannot be determined by monitoring the energy radiating from the power supply or by monitoring the current that is driven by the power supply from an external source.

BRIEF DESCRIPTION OF THE DRAWINGS

FIG. 3(A) shows characteristics of the current supplied by the power supply as a function of time; FIG. 3(B) depicts the current characteristics across the load as a function of time; and FIG. 3(C) depicts voltage characteristics across the energy storage means as a function of time.

DETAILED DESCRIPTION OF THE INVENTION

Figure 1:
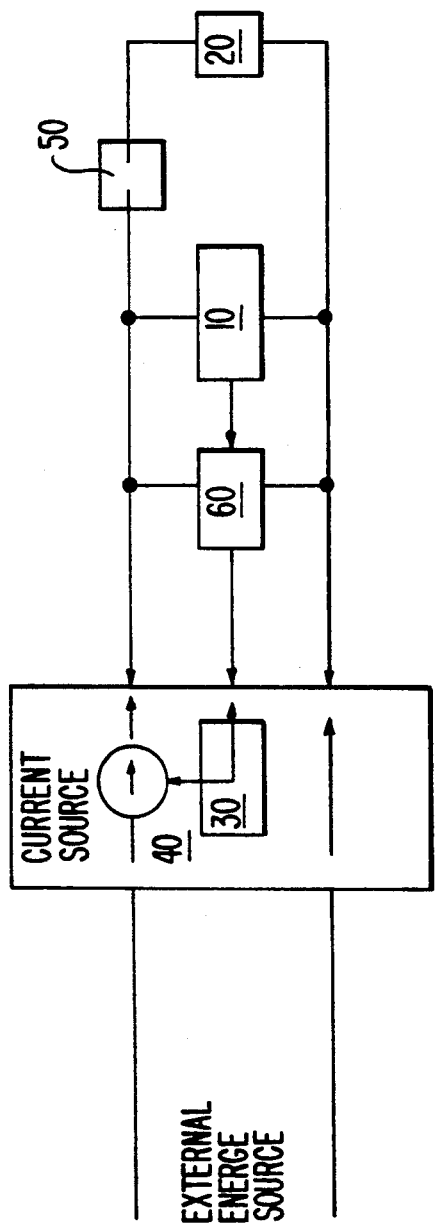
FIG. 1 is a schematic circuit diagram of a preferred embodiment of the present invention.
Figure 2:
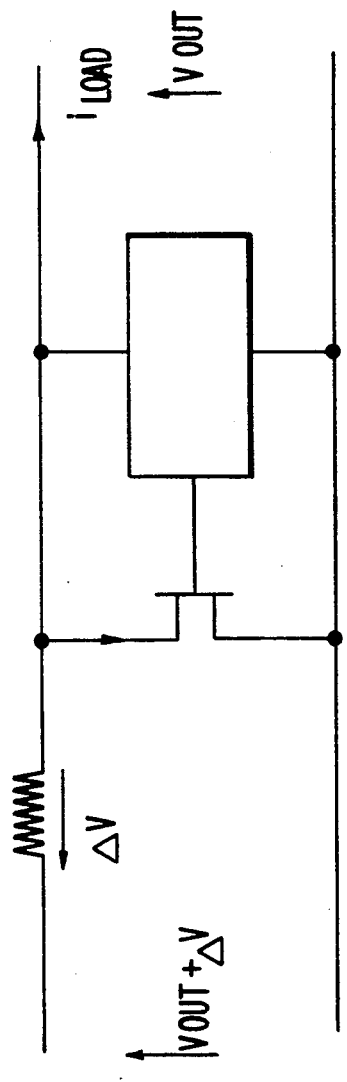
FIG. 2 is a schematic circuit diagram of a basic secure power supply using a complimentary parallel load.

Reference will now be made in detail to a present preferred embodiment of the present invention, an example of which is illustrated in the accompanying drawings. The accompanying drawings are incorporated herein and made a part of this specification by reference. A present preferred embodiment of the invention is shown in FIG. 1.

In the preferred embodiment, the circuit of the present invention comprises power supply 40, load 20, energy storage means 10, comparator means 60, and switching means 30 and regulator 50. Power supply 40 is coupled to load 20. Power supply 40 supplies current to the energy storage device 10 so that energy storage device 10 can power load 20. Comparator 60 monitors the voltage across energy storage means 10 $V_c$. When the voltage across energy storage means 10 $V_c$ equals a reference voltage, comparator means 60 signals switching means 30 to switch the current supplied by power supply 40 to a different current level. Regulator 50 maintains a constant current across load 20.

Figure 3A:
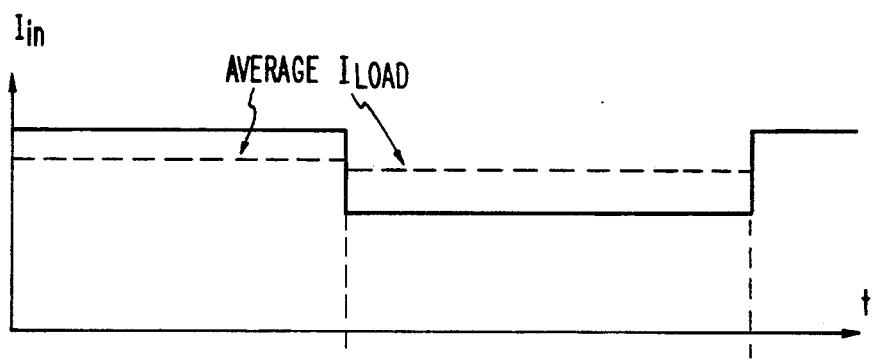
FIG 3(A) to 3(C) are graphs depicting certain characteristics of the circuit of FIG. 1, namely.

In a preferred embodiment of the invention, power supply 40 supplies current to energy storage means 10 at two or more different, predetermined levels. These include first and second current levels. First current level $I_H$ is higher than the average current required to power load 20 and second current level $I_L$ is lower than the average current required to power load 20. FIG. 3A depicts schematically the relationship of current to time and shows current flowing from power supply 40 at first and second current levels. The average current level required by load 20 is depicted in FIG. 3(A) by the dashed line.

Power supply 40 is a current regulator power supply. The current regulator power supply 40 is of the type generally known in the industry. For example, the linear voltage-controlled current sources found in "1980 National Semiconductor Linear Databook" (part nos. LM129/LM329) or the switching power supply found in the "1987 Unitrode Linear Integrated Circuits," (part no. UC3842) can be employed as the power supply of the present invention.

In a preferred embodiment of the present invention, energy storage means 10 can be any device which stores electrical energy, such as a capacitor or battery. Energy storage means 10 has a capacity large enough to handle the different current levels supplied by power supply 40. Energy storage means 10 receives current at first and second current levels $I_H$ and $I_L$, respectively, from power supply 40 to power load 20. First current level $I_H$ is established so that it is higher than the average current required by the load 20. When current is supplied by power supply 40 at first current level $I_H$, energy storage means 10 receives more energy than that needed to power load 20 and energy storage means 10, therefore, charges. The voltage across energy storage means 10 $V_C$, therefore, increases until $V_C$ equals an upper reference voltage $V_H$. Upper reference voltage $V_H$ is established at an arbitrary voltage value that is slightly higher than the average voltage required by load 20.

Second current level $I_L$ is established so that it is lower than the average current required by load 20. When power supply 40 supplies current to energy storage means 10 at second current level $I_L$, the voltage across energy storage means 10 $V_C$ decreases under the influence of load 20. Energy storage device 10, therefore, discharges until the voltage across energy storage means 10 $V_C$ reaches a lower reference voltage $V_L$. Lower reference voltage $V_L$ is established at an arbitrary voltage value lower than the average voltage required by load 20 and regulator 50.

Comparator means 60 compares voltage $V_C$ across energy storage means 10 to first and second reference voltages $V_H$ and $V_L$. If $V_C$ equals either first or second reference voltage, comparator means 60 signals switching means 30 to modify the current supplied to energy storage device 10 by power supply 40. Comparator 60 is of the type generally known in the industry, for example, "1985 Motorola Linear and Interface IC's Data Book" (part nos. LM139,A, LM239,A, LM339,A, LM2901, or MC3302), or "1987 Linear Data manual, Volume 2: Industrial, Signetics, Inc." (part no. NE522) can be employed as comparator 60 in FIG. 1 of the present invention. When the current supplied to energy storage means 10 is altered, the charging state of energy storage means 10 changes. Switching means 30 can be any number of devices such as gate controlled relays, transistors, etc.

In operation, assuming power supply 40 is supplying current at the energy storage means 10 first current level $I_H$, the energy storage device 10 will charge until comparator means 60 detects that the voltage across energy storage means has risen to the first reference voltage $V_H$. Once comparator means 60 detects that the voltage across energy storage device 10 $V_C$ has reached first reference voltage $V_H$, comparator 60 signals switching means 30 to switch power supply 40 to deliver current to energy storage means at second current level $I_L$. While current is being supplied to energy storage means 10 at second current level $I_L$, energy storage device 10 discharges under the influence of load 20. The voltage across energy storage means $V_C$, therefore, falls. When comparator means 60 detects that the voltage across energy storage means $V_C$ has fallen to second reference voltage $V_L$, comparator means 60 again signals switching means 30. Switching means 30 then switches power supply 40 to supply current to energy storage means 10 at first current level $I_H$.

Comparator means 60 continuously compares voltage $V_C$ across energy storage device 10 with the reference voltages to $V_H$ and $V_L$ to activate switching means 30 accordingly and ensure that energy storage means 10 receives sufficient power to supply load 20 while keeping the electrical characteristics of the load 20 independent of the electromagnetic energy radiated by power supply 40.

Figure 3B:
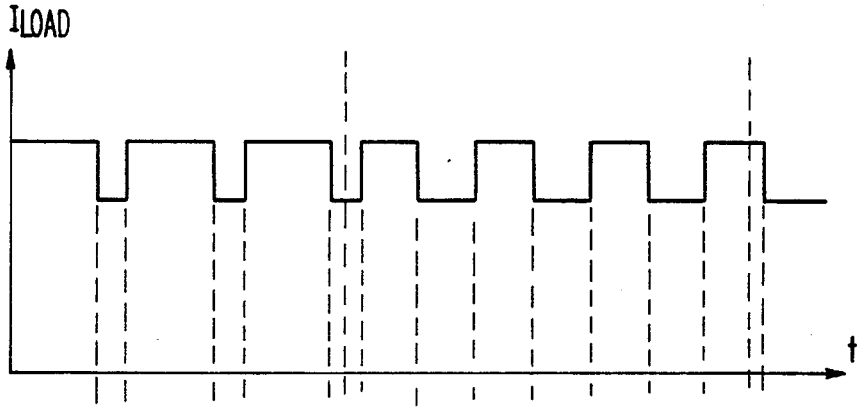
Figure 3C:
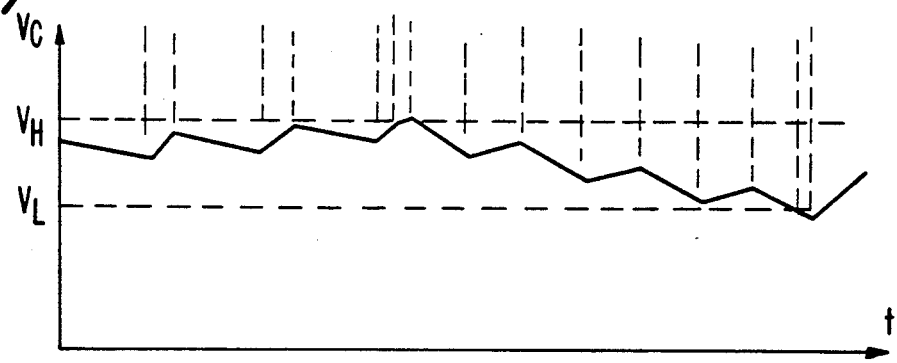

FIG. 3C depicts schematically the voltage $V_C$ across storage device 10 as a function of time, relative to current supplied by power source 40. While current is being supplied to energy storage means 10 by power source 40 at first current level, energy storage device 10 charges until the voltage $V_C$ across energy storage device 10 reaches the first reference voltage $V_H$. FIG. 3(C). When comparator 60 detects that the voltage $V_C$ across energy storage means 10 equals first reference voltage $V_H$, comparator 60 activates switching means 30, which in turn controls power supply 40 to supply current to energy storage means 10 at second current level $I_L$. FIG. 3(A). The voltage $V_C$ across energy storage device 10 then decreases under the influence of load 20, as energy storage means 10 discharges under the influence of load 20. As depicted by a comparison of FIG. 3(A) and (C), voltage $V_C$ is at its highest state and its lowest state relative to the current supplied by power supply 40 when the input current to energy storage means 10 is in transition from first current level to second current level, and vice versa.

With the power supply slowly cycling between the first and second current levels, relative to the demand characteristics of the load 20, energy storage device 10 provides current to the load as required to maintain the proper voltage across the load with virtually no influence from the changes in first and second current levels supplied to energy storage means 10 by power supply 40. Hence, monitoring the radiated spectrum of the power supply will not reveal the electrical characteristics of load 20. Such monitoring will disclose only a curve of the form depicted in FIG. 3(A), as opposed to the actual current drawn by the load, which is depicted schematically in FIG. 3(B).

The capacity of the energy storage means 10 must be large enough that the largest difference in charging current between the power supply and any of the true loads cannot substantially change the output voltage of the energy storage means 10. Hence, the switching time must be shorter than a few cycles of the lowest frequency of the load being isolated.

It will be apparent to those skilled in the art that various modifications and variations can be made to switch 30, comparator 60, and energy storage device 10 of the circuit of the present invention without departing from the spirit or scope of the invention. The constant current levels provided by power supply 40 can consist of a first through fourth current level. It is intended that the present invention cover the modifications and variations of the invention, provided they come within the scope of the appended claim and their equivalents.

I claim:

1. A circuit for isolating the electrical characteristics of a load from the electromagnetic radiation emanating from a power supply comprising:
   energy storage means for receiving electrical energy from the power supply and supplying current to said load;
   switching means for controlling the current supplied by the power supply to said energy storage means so that said power supply delivers electrical energy to said energy storage means at first and second current levels, said first current level being greater than the average current required to supply the load and said second current level being less than the average current required to supply the load, wherein said first and second current levels are isolated from the current supplied to said load through said energy storage means; and
   comparator means for comparing the level of charge of said energy storage means to a reference voltage and actuating said switching means so that the current supplied by the power supply to said energy storage means alternates between said first and second current levels to isolate the electrical characteristics of the load from the electromagnetic radiation emanating from the power supply.

2. The circuit according to claim 1, wherein said switching means is a transistor.

3. The circuit according to claim 1, wherein said switching means is an inverter or other digital logic control gate.

4. The circuit according to claim 1, wherein said switching means is a plurality of resistors.

5. The circuit according to claim 1, wherein the electrical storage means is a capacitor.

6. The circuit according to claim 1, wherein the comparator means is a plurality of transistors.

7. A circuit for isolating the electrical characteristics of a load from the electromagnetic radiation emanating from a power supply comprising:
   energy storage means for receiving electrical energy from the power supply and supplying current to said load wherein said current to said load is isolated from the output current from the power supply to isolate the electrical characteristics of the load from the electromagnetic radiation emanating from the power supply;
   switching means for controlling the current supplied by the power supply to said energy storage means so that the power supply delivers electrical energy to said energy storage means at first and second current levels, said first current level being greater than the average current required to supply the load and at said second current level lower than the average current level required to supply the load, wherein said switching means controls the power supply to ensure that said energy storage means receives sufficient power to supply said load while keeping the electrical characteristics of the load independent of the electromagnetic radiation emanating from the power supply;
   comparator means for comparing the voltage across said energy storage means to first and second reference voltages and actuating said switching means in response to said voltage across said energy storage means;
   said first reference voltage being greater than said second reference voltage; and
   said switching means controlling the power supply so that when said comparator means detects that the voltage across said energy storage means reaches said first reference voltage, said switching means causes the power supply to provide electrical power to said energy storage means at said second current level and when said comparator means detects that the voltage across said energy storage means equals said second reference voltage, said switching means causes the power supply to provide electrical power to said energy storage means at said first current level.

8. The circuit according to claim 7, wherein said switching means is a transistor.

9. The circuit according to claim 7, wherein said switching means is a inverter or other digital logic control gate.

10. The circuit according to claim 7, wherein said switching means is a plurality of resistors.

11. The circuit according to claim 7, wherein the electrical storage means is a capacitor.

12. The circuit according to claim 7, wherein the comparator means is a plurality of transistors.

13. A circuit for isolating the electrical characteristics of a load from the electromagnetic radiation emanating from a power supply comprising:
   a capacitor receiving energy from the power supply and supplying current to the load, wherein said current to the load is isolated from the output current from the power supply to isolate the electrical characteristics of the load from the electromagnetic radiation emanating from the power supply;
   switching means for controlling the current supplied by the power supply to said capacitor so that the power supply delivers electrical energy to said capacitor at first and second current levels, said first current level being higher than the average current required to supply the load and said second current level being lower than the average current required to supply the load, so that said capacitor is charging in spite of the influence of the load at said first current level and discharging under the influence of the load at said second current level, wherein said switching means controls the power supply to ensure that said capacitor receives sufficient power to supply the load while keeping the electrical characteristics of the load independent of the energy from the power supply;

comparator means for comparing the volage across said capacitor to first and second reference voltages and actuating said switching means in response to said voltage across said capacitor;

said first reference voltage being greater than said second reference voltage; and said switching means controlling the power supply so that when said comparator means detects that the voltage across said capacitor reaches said first reference voltage, said switching means causes the power supply to provide electrical power to said energy storage means at said second current level and when said comparator means detects that the voltage across said energy storage means equals said second reference voltage, said switching means causes the power supply to provide electrical power to said energy storage means at said first current level.

14. The circuit according to claim 13, wherein said switching means is a transistor.

15. The circuit according to claim 13, wherein said switching means is a digital logic control gate.

16. The circuit according to claim 13, wherein said switching means is a plurality of resistors.

17. The circuit according to claim 13, wherein the comparator means is a plurality of transistors.

* * * * *